No. 784,352.  Patented March 7, 1905.

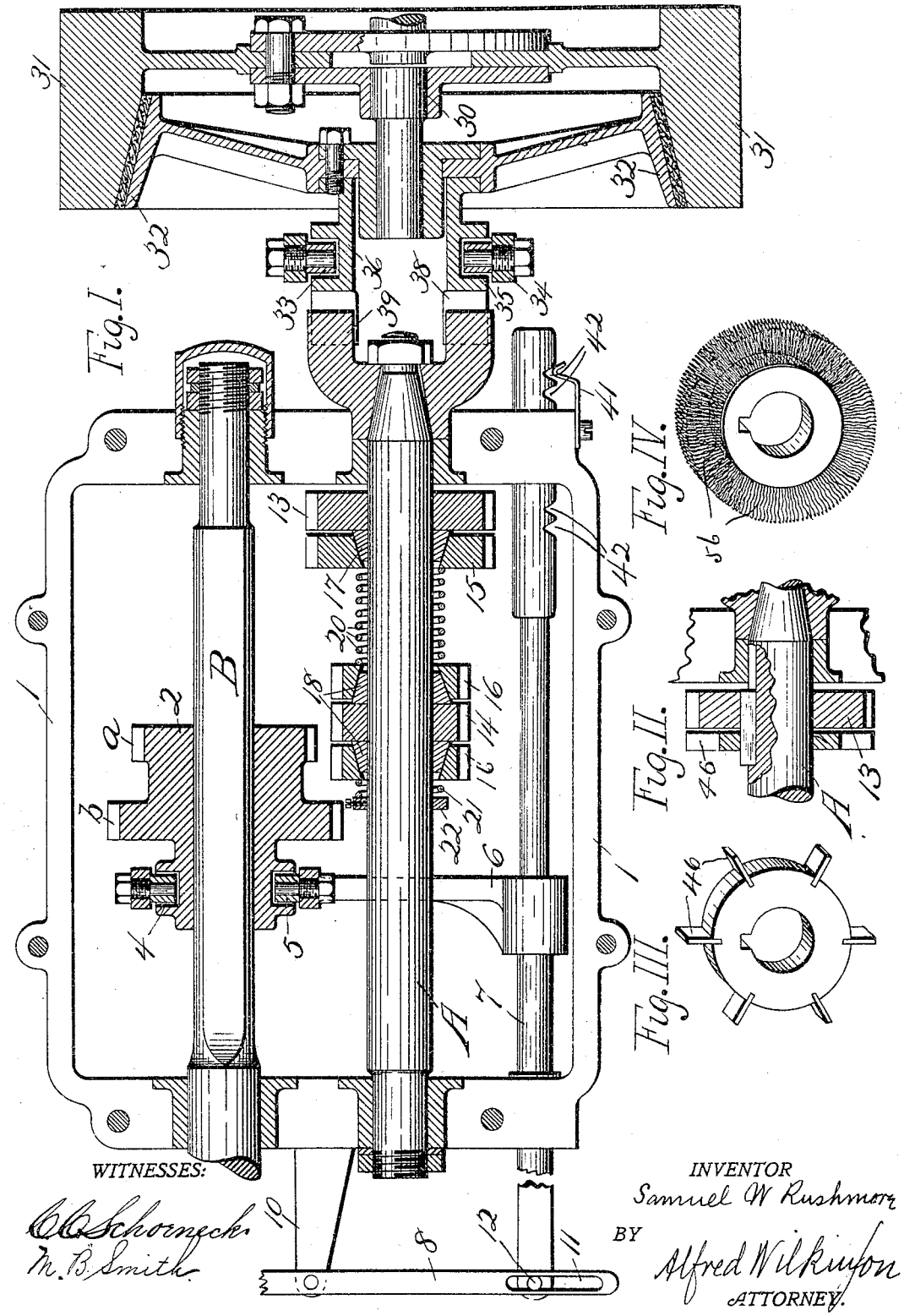

UNITED STATES PATENT OFFICE.

SAMUEL W. RUSHMORE, OF PLAINFIELD, NEW JERSEY.

POWER-TRANSMITTING DEVICE.

SPECIFICATION forming part of Letters Patent No. 784,352, dated March 7, 1905.

Application filed April 27, 1904. Serial No. 205,058.

*To all whom it may concern:*

Be it known that I, SAMUEL W. RUSHMORE, a citizen of the United States, residing at Plainfield, in the county of Union and State of New Jersey, have invented certain new and useful Improvements in Power-Transmitting Devices; and I do hereby declare the following to be a full, clear, and exact description of the invention, such as will enable others skilled in the art to which it appertains to make and use the same.

My invention relates to a variable-speed power-transmitting device having a driving and a driven shaft in which different rates of speed of the driven shaft are obtained by shifting a gear on one shaft in turn into mesh with one or the other main gears of different diameter fixed on the other shaft, sometimes called "changeable-gear" mechanism. The main gears and the sliding gear are of course arranged on different shafts and on one or the other, as may be most convenient. As here shown, the main gears are on the driving-shaft and the sliding gear on the driven shaft. As now commonly constructed in such mechanisms used with autocars or elsewhere when a sudden change in speed or a change from rest to speed is effected on account of the inertia a severe strain and a heavy shock is imposed on these gears, so that the teeth are often broken or stripped, and commonly the corners of the teeth are quickly worn out, because the sliding gear is not immediately thrown into complete engagement.

My invention consists in arranging yielding gears in front of the main gears of different diameters, with which yielding gears the sliding gear first engages, so that by such preliminary engagement the speed of the shaft is accelerated or retarded and the gears are brought more or less to a similar or equal peripheral speed before the engagement with the main gears, and the main gears are thus largely relieved of shock and strain.

My invention will be understood by reference to the drawings herewith, in which the reference letters and numerals of the specification indicate the corresponding parts in all the figures.

Figure I is a longitudinal section of a changeable-gear mechanism, illustrating my invention. Fig. II is a fractional section, and Figs. III and IV are isometric views of a change in construction adapted to accomplish the same result.

In the figures, A indicates the driving and B the driven shafts, suitably journaled in a case 1, the latter carrying the sliding gear 2, fixed to rotate with the shaft and being a compound gear $a\,b$ of different sizes. This is provided with a circumferential groove 4, with which engages the antifriction-rollers 5 on the forked ends of power-lever 6, fixed on sliding shaft 7 and operated by hand-lever 8, suitably arranged and supported on a suitable arm 10. Said hand-lever may engage with the sliding shaft by means of slot 11 and pin 12. Any other suitable means may be provided for sliding the sliding gear, and it is evident that this sliding gear may be fixed on its shaft and said shaft moved to vary position of sliding gear.

On the driving-shaft are fixed the main gears 13 and 14 of different diameters to mesh, respectively, with compound sliding gear $a\,b$ for low and high speed, respectively. There may be two, three, or more of these main gears for different speeds and reverse. On the side or sides of these main gears are arranged my yielding gears, with which the sliding gear-teeth first engage to begin the rotation or to diminish or to increase the speed of the driven shaft. In Fig. I these yielding gears 15 16 16 are held in frictional engagement with the shaft by any suitable means. As here shown, they are forced, respectively, into frictional engagement with the conical or tapering hubs 17 18 18 on the main gears by suitable springs 20 21, the latter being held in position on the shaft A by collar 22, so that as the sliding gear is thrown into engagement with one or the other of these yielding gears the inertia is overcome, the speed of the driven shaft in a measure accelerated or retarded, and before the parts can be exposed to excessive strain or to injury the yielding gears will slip on the conical hubs.

30 indicates the engine-shaft; 31 and 32, respectively, the female and male members of a friction-clutch which is operated to transmit the power by the engagement of antifriction-rollers 33 of a forked lever 34 with the circumferential groove 35 on the hubs 36 of the male element, also carrying a fork or claw 38, engaging with a corresponding fork or claw 39, fixed on the end of the driving-shaft A.

To guard against partial engagement of the sliding gear with the main gears and the danger of breaking off the corners of the teeth, I have provided means for suddenly accelerating the longitudinal movement of the sliding shaft, and thereby effecting the instantaneous and complete engagement of the sliding gear with the main gear—namely, a suitable spring 41—and inclines or notches 42 42 on the sliding shaft 7, fitted to engage with the spring, whereby as the shaft is moved and the sliding gear approaches the engaging position the movement of the sliding shaft is accelerated and the sliding gear instantaneously forced into engagement.

Instead of accomplishing the result by frictional engagement of the yielding gears with the main gears a similar result may be accomplished by providing them with yielding or resilient teeth 46, as shown in Fig. III, or even constructing them in the form of cylindrical metallic brushes 56, by which a yielding but sufficient engagement first takes place with the sliding gears to overcome the inertia. When my yielding gears (or gear-like elements) are so formed, they could be keyed or otherwise fixed on the shaft, as shown in Fig. II, it being sufficient if their peripheral portions afford a yielding engagement and not necessary for the entire yielding gear to slip on the shaft.

I do not propose to limit myself to the form and arrangement of parts here shown, as they may be varied without departing from the spirit of my invention.

Having thus described my invention, what I claim, and desire to secure by Letters Patent, is—

1. In a power-transmitting mechanism, the combination with a suitable support, of parallel shafts, a series of gears fixed on one shaft, a sliding gear fitted to turn with the other shaft and adapted to be moved longitudinally, means to move the sliding gear into engagement with the fixed gears, and yielding gear-like elements arranged on the first shaft at the sides of the fixed gears, first to engage with the sliding gear.

2. In a power-transmitting mechanism, the combination with a suitable support, of parallel shafts journaled therein, a series of main gears fixed on one shaft, a sliding gear fitted to turn with and slide on the second shaft, means to slide the sliding gear on its shaft, and yielding gears carried on the first shaft and maintained in frictional engagement with the respective fixed gears to engage with the sliding gear before it is moved into engagement with the fixed gears.

3. In a power-transmitting mechanism, the combination with a suitable support, of parallel shafts journaled therein, a series of main gears fixed on one shaft, said gears being provided with tapering hubs, a sliding gear on the second shaft, means to move the sliding gear into engagement with the fixed gears, and yielding gears fitted to the tapering hubs and frictionally engaging therewith.

4. In a power-transmitting mechanism, the combination with a suitable case, of two parallel shafts journaled therein, a series of main gears of different sizes fixed on the first shaft, said gears having tapering hubs, a sliding-gear element fitted to slide on and turn with the second shaft, gears of different size on the sliding-gear element to engage with the respective fixed gears, means to slide the sliding element, yielding gears fitted to the tapering hubs, and springs to force the yielding gears into frictional engagement with the hubs.

5. In a power-transmitting mechanism, the combination with a suitable case, of a driving-shaft journaled therein, means to connect said shaft to the source of power, a parallel driven shaft journaled in the case, a series of gears of different sizes fixed on the driving-shaft, said gears having tapering hubs, a sliding element fitted to slide on and turn with the driven shaft, a series of gears of different diameters on the sliding element to engage with the respective fixed gears, yielding gears fitted to said hubs, and springs arranged on the shaft to maintain the yielding gears in frictional engagement with the hubs.

6. In a changeable-gear mechanism for transmitting power, the combination with a suitable case, of two parallel shafts journaled therein, gears fixed on one shaft, a sliding-gear element fixed on the second shaft, a sliding bar fitted in the case and having inclined portions, an arm fixed on said bar and engaging with the sliding element, and a spring arranged to engage with the inclined portion to accelerate the longitudinal movement of the bar and the engagement of the gears.

7. In a power-transmitting mechanism, the combination with a suitable support, of two parallel shafts journaled therein, a series of main gears of different sizes fixed on one shaft, a sliding gear fitted to turn with the other shaft, means to move the sliding gear into and out of engagement with the main gears, and means to accelerate the movement of the sliding gear at the point of engagement, to effect a rapid and complete engagement of said gears.

8. A power-transmitting mechanism having a driving-shaft and a driven shaft, one or more gears rigidly secured on one of the shafts, gears slidably mounted upon the other shaft, to be moved into or out of mesh with the fixed gear or gears, means for accelerating or retarding the speed of one of the shafts so that the gears may be brought approximately to the same peripheral speeds before being thrown into mesh.

9. In a variable-speed, power-transmitting mechanism the combination of a shaft, one or more main gears rigidly attached thereto, a second shaft, one or more sliding gears fitted to rotate with the second shaft and capable of endwise movement, said sliding gears being adapted to mesh with the main gear or gears on the first shaft and yielding gears arranged to be brought into mesh to accelerate or retard the speed of one or the other of the shafts so that the main and sliding gears may be brought approximately to the same peripheral speeds before being thrown into mesh.

10. In a variable-speed, power-transmitting device, a shaft, one or more gears rigidly attached thereto, a second shaft, one or more sliding gears fitted to rotate with the second shaft and to move endwise thereon, means for sliding one of the sliding gears into mesh with the rigid gears and devices frictionally driven by one of the shafts and adapted to accelerate or retard the motion of one of the shafts so that the gears may be brought approximately to the same peripheral speed before being thrown into mesh.

In testimony whereof I affix my signature in presence of two witnesses.

SAMUEL W. RUSHMORE.

Witnesses:
C. C. SCHOENECK,
M. B. SMITH.